(12) United States Patent
Freudelsperger

(10) Patent No.: US 7,748,519 B2
(45) Date of Patent: Jul. 6, 2010

(54) VERTICAL CONVEYOR IN A COMMISSIONING SYSTEM FOR VERTICALLY CONVEYING GOODS THAT ARE TO BE TRANSPORTED

(75) Inventor: Karl Freudelsperger, Hart bei Graz (AT)

(73) Assignee: Knapp Logistik Automation GmbH, Hart bei Graz (AT)

( * ) Notice: Subject to any disclaimer, the term of this patent is extended or adjusted under 35 U.S.C. 154(b) by 208 days.

(21) Appl. No.: 11/815,816

(22) PCT Filed: Feb. 11, 2006

(86) PCT No.: PCT/EP2006/001259

§ 371 (c)(1),
(2), (4) Date: Aug. 8, 2007

(87) PCT Pub. No.: WO2006/084750

PCT Pub. Date: Aug. 17, 2006

(65) Prior Publication Data

US 2008/0257686 A1    Oct. 23, 2008

(30) Foreign Application Priority Data

Feb. 14, 2005    (DE) .................. 10 2005 006 546

(51) Int. Cl.
*B65G 47/44* (2006.01)
(52) U.S. Cl. ................... 198/550.01; 198/523; 198/532
(58) Field of Classification Search ............ 198/550.01, 198/523, 526, 530, 532, 535, 537, 539, 704, 198/713, 418.6, 435, 540, 541, 550.4, 550.5; 222/505, 506, 559, 544, 561, 545, 502, 503, 222/504, 507, 508, 556, 460, 461, 476, 495, 222/498; 193/25 C, 25 S, 32
See application file for complete search history.

(56) References Cited

U.S. PATENT DOCUMENTS 132,974 A * 11/1872 Miles .......................... 266/176

(Continued)

FOREIGN PATENT DOCUMENTS

EP            0 396 925 A1    11/1990

(Continued)

*Primary Examiner*—Gene Crawford
*Assistant Examiner*—William R Harp
(74) *Attorney, Agent, or Firm*—McGlew and Tuttle, P.C.

(57) ABSTRACT

A vertical conveyor (1) is provided in a commissioning system for vertically conveying piece good-type conveying materials of a commissioning order from an upper transfer point (2) to a lower transfer point (3) of the commissioning system. The conveyor includes a vertically oriented receiving device which supports the conveying materials and is open towards the bottom. The receiving device is provided through which conveying material that has been accommodated in the open state falls down into a closest bottom vertically oriented receiving device and/or onto the lower transfer point (3). The receiving device is embodied in the form of a tray or shell between the transfer points (2, 3). The shell can be opened on the bottom side and encompasses two vertical tilting walls (9, 9') that face each other and can be opened on the bottom side or two horizontal slides (25, 25') which face each other and can be opened on the bottom side as an opening mouth. The two pivotable vertical tilting walls (9, 9'), whose swivel pins can be vertically adjusted in vertical guide rails (12, 13), or the two horizontal slides (25, 25') are laterally guided in horizontal guide rails (11 or 26) in the area of the opening mouth of the tray (4, 4') located on the bottom side.

2 Claims, 9 Drawing Sheets

U.S. PATENT DOCUMENTS

| | | | | |
|---|---|---|---|---|
| 1,422,198 A | * | 7/1922 | Guerin | 141/360 |
| 1,956,310 A | * | 4/1934 | Boyd | 169/15 |
| 2,515,137 A | * | 7/1950 | Schall et al. | 99/324 |
| 3,472,399 A | * | 10/1969 | Felts | 414/304 |
| 3,815,763 A | * | 6/1974 | Biloco et al. | 414/267 |
| 3,850,349 A | * | 11/1974 | Pirovano | 222/529 |
| 3,986,622 A | * | 10/1976 | Vaughan et al. | 414/142.4 |
| 4,004,700 A | * | 1/1977 | Empey | 414/142.3 |
| 4,338,058 A | * | 7/1982 | Davenport | 414/142.3 |
| 4,561,467 A | * | 12/1985 | Rouse et al. | 137/624.18 |
| 4,871,059 A | * | 10/1989 | Rantanen et al. | 198/532 |
| 4,978,252 A | * | 12/1990 | Sperber | 406/64 |
| 5,289,909 A | * | 3/1994 | Maxwell et al. | 193/6 |
| 5,758,477 A | * | 6/1998 | Wilson et al. | 53/500 |
| H1747 H | * | 9/1998 | Saeki et al. | 53/443 |

FOREIGN PATENT DOCUMENTS

| | | |
|---|---|---|
| FR | 2 613 957 A1 | 10/1988 |
| JP | 2000-25891 | 1/2000 |
| WO | WO 2004/087503 A1 | 10/2004 |

* cited by examiner

Fig._1

Fig_2

VERTICAL CONVEYOR IN A COMMISSIONING SYSTEM FOR VERTICALLY CONVEYING GOODS THAT ARE TO BE TRANSPORTED

CROSS REFERENCE TO RELATED APPLICATIONS

This application is a United States National Phase application of International Application PCT/EP2006/001259 and claims the benefit of priority under 35 U.S.C. §119 of German Patent Application DE 10 2005 006 546.5 filed Feb. 14, 2005, the entire contents of which are incorporated herein by reference.

FIELD OF THE INVENTION

The present invention pertains to a vertical conveyor in a commissioning system for vertically conveying materials being conveyed of a commissioned order, which are of the type of individually packaged products, from an upper transfer point to a vertically oriented lower transfer point of the commissioning system by means of a vertically oriented support, which supports the materials being conveyed and can be opened downwardly.

BACKGROUND OF THE INVENTION

Vertical conveyors in the form of circulating paternoster elevators and oscillating vertical elevators, for example, within a commissioning shelf of a commissioning unit, are known according to the state of the art. So-called circulating C conveyors and circulating S conveyors are also known as vertical conveyors, for example, according to EP 0 396 925 A1. A mobile support, e.g., platform, cabin or the like, which supports the materials being conveyed and is guided in a height-adjustable manner and in the vertical direction by means of a mechanical drive, is characteristic of all the aforementioned vertical conveyors. The complicated mechanical drive, the complicated guiding and especially the bulky overall design, which is designed for a single individual height difference only, between which the material being conveyed is to be transported, are disadvantageous. If the material being conveyed shall be transported over a smaller or greater height, the system cannot be expanded or converted, at least not with simple means. Consequently, the prior-art systems lack flexibility, i.e., the adaptability to different conveying heights.

SUMMARY OF THE INVENTION

The object of the present invention is to provide a vertical conveyor of the type described in the introduction, which has a simple design, can be used in a commissioning system reliably and effectively and can be adapted to different local conditions and/or different operating conditions of the commissioning process with simple means.

The essence of the present invention is a vertical conveyor with at least one support, which can be opened downwardly and through which picked-up material being conveyed falls in the opened state downwardly into a next lower, vertically oriented support and/or onto the lower transfer point, the support being provided in the form of a shell (or tray), which can be opened on the bottom side, between the transfer points, with two adjustable tilting walls, which point towards each other, or with two horizontal slides as an opening mouth, which face each other and can be opened on the bottom side, wherein the two pivotable adjustable tilting walls, whose pivot axes are adjustable in height in vertical guide rails, or the two horizontal slides are guided laterally in horizontal guide rails in the area of the bottom-side opening mouth. It is obvious that the shell according to the present invention may also be designed as a container with a high circumferential edge.

Consequently, the present invention provides for two tilting walls of identical design in a shell in a first basic embodiment variant. Each tilting wall is not pivotable, e.g., about a stationary pivot axis, but the horizontal pivot axis itself is adjustable in height according to the present invention in vertical guide rails. The end of each tilting wall that is away from the pivot axis is additionally guided according to the present invention in horizontal guide rails laterally in the area of the opening mouth of the shell. The opening mouth is comparatively large when the shell is opened, and the tilting wall is in a steep or nearly vertical position. When the shell is closed, the tilting wall assumes a flat position slightly sloping in relation to the horizontal and forms, together with the other tilting wall, the angular bottom of the shell. If such a shell is opened by simultaneously actuating both tilting walls, the picked-up material being conveyed falls downward centrally without becoming laterally offset. Even if only one tilting wall is opened on one side, the material being conveyed still reaches a next shell or the like sufficiently accurately vertically downwardly. The slope of the closed tilting wall causes the shell to be emptied nevertheless completely. The motion process of the stable tilting wall is clearly defined by the vertical and horizontal guide means according to the present invention. As a result, comparatively large shells with a large opening mouth can be set up with a compact design.

Similar statements can also be made concerning the other basic embodiment variant of the present invention, in which the shell has, on the bottom side, two horizontal slides of an identical design, which likewise create a large opening mouth and whose top side is preferably likewise formed by oblique surfaces. The two horizontal slides are sufficiently guided on the entire horizontal support, so that it is possible to construct larger shells in this case as well. The vertical guiding of the first embodiment variant can be eliminated here.

In particular, a plurality of identical shells spaced at equal distances are provided in a vertical arrangement as a vertical tower, which bridge over the height difference between the upper and lower transfer points, in which case at least two vertical towers can be provided in a parallel arrangement.

The shells are especially preferably at least largely self-contained components or structural modules, the number of structural modules, which can preferably be plugged into one another vertically, being determined by the conveying height or the height difference to be bridged over between the upper and lower transfer points.

The upper transfer point may be the longitudinal end or the lateral end area of a horizontal central belt of an automatic commissioning unit, while the lower transfer point is preferably the inlet of a horizontal discharge belt with a container containing the ordered goods located thereon or a buffer hopper.

Especially in the above-mentioned case, the shells may be used as intermediate storage means of at least one order of a material being conveyed.

The above-mentioned vertical conveyor can be operated in different ways especially by cycling opened and/or closed shells differently from the topmost shell to the lowermost shell.

On the one hand, directly adjacent shells can be opened and closed alternatingly in order to transport material being conveyed up to the lower transfer point.

However, the material being conveyed may also pass, on the other hand, through one or more adjacent shell(s), which are opened simultaneously, and optionally even through all opened shells simultaneously.

Since the shells have two openable tilting walls or two bottom-side slides, the tilting walls or slides of adjacent shells can be opened such that the material being conveyed passes through at least some of the shells in a cascading manner in a zigzag pattern.

Even before the material being conveyed is transferred at the lower transfer point, the closed topmost shell may optionally be filled with material being conveyed of the same commissioned order or of a new commissioned order.

Consequently, the present invention preferably pertains to the special design of an automatic transfer point for the height difference between a central belt and a container conveyor technique which is located at a lower level and follows it. The transfer point may also be designed for separate automatic commissioning units located one on top of another. The automatic transfer takes place by means of shells located one on top of another, whose number depends on the vertical height to be bridged over. The upper automatic unit delivers the orders (preferably one order each) into the topmost shell by means of a central belt. By inching forward, the particular order is transferred into the shell located underneath. The lowermost shell ultimately transfers the order to a common lower transfer point (buffer hopper).

The present invention utilizes with a special advantage the discovery that sufficiently stable material being conveyed, which is to be conveyed only from top to bottom anyway in the entire conveying system of the commissioning plant(s), can be transported in a metered manner at a high speed at least over defined partial sections by free fall downwardly by cycling stationary openable shells or containers and optionally also stored intermediately, without complicated drive means being necessary for conveying, and without the material being conveyed or the packaging thereof being damaged. If the unit requires longer vertical conveying sections, more individual shells, preferably of an identical design, are quite simply used. In case of especially stable or insensitive material being conveyed, the entire conveying height can be passed through by free fall, preferably in a zigzag pattern. The practical operation shows that conveying heights of several meters can be overcome without problems in this manner in many cases of a material being conveyed without the prior-art complicated elevator system with mobile shells and a conveying drive of its own and a vertical guide of its own having to be used.

Even though, for example, oblique chutes, which transport the material being conveyed downwardly, utilizing free fall, are known in commissioning systems, vertical downward conveying with a metered free fall and/or with the possibility of storing the material being conveyed intermediately is not known. Oblique chutes are also unsuitable for different vertical heights and cannot be expanded in a modular system, at least not in case of a crowded space.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
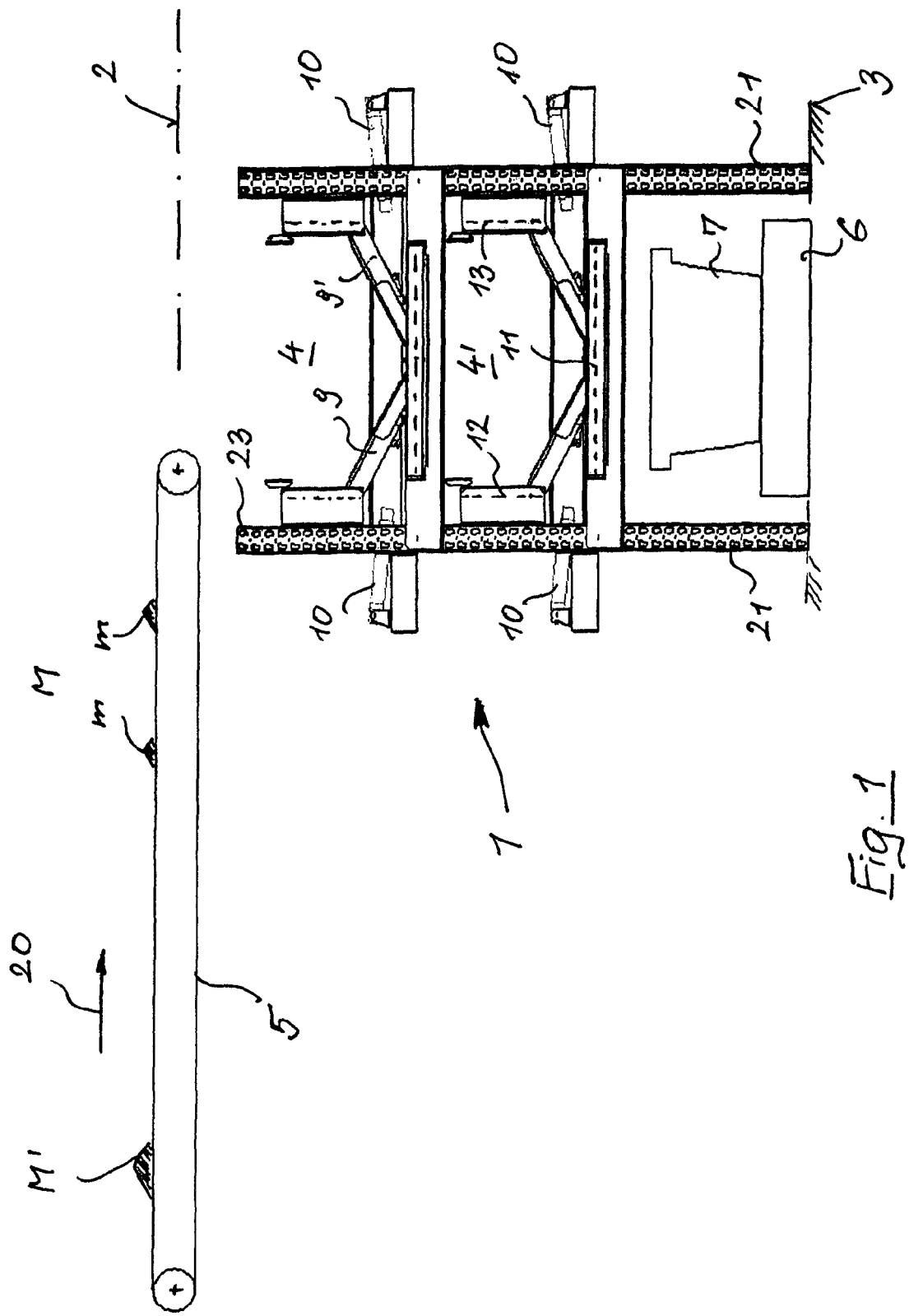
FIG. 1 is a schematic vertical sectional view of a vertical conveyor according to the present invention between a central belt located in a high position and a connecting conveyor belt of a commissioning system, which latter conveyor belt is located in a low position, the central band and the connecting conveyor belt not being shown true to scale compared to the vertical conveyor.
Figure 2:
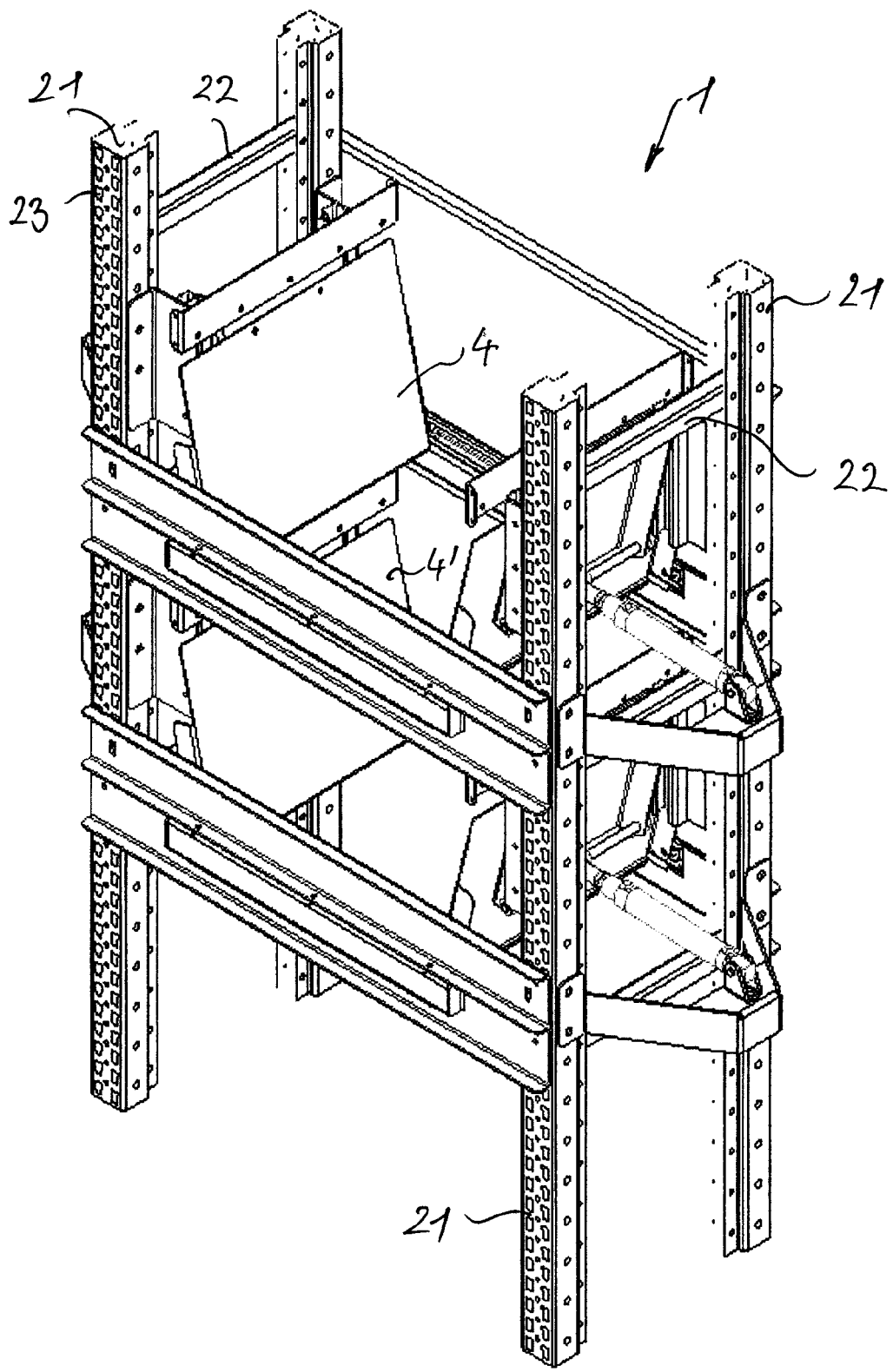
FIG. 2 is a schematic cut-away perspective view of the vertical conveyor essentially according to FIG. 1 with two adjacent opened shells.
Figure 3:
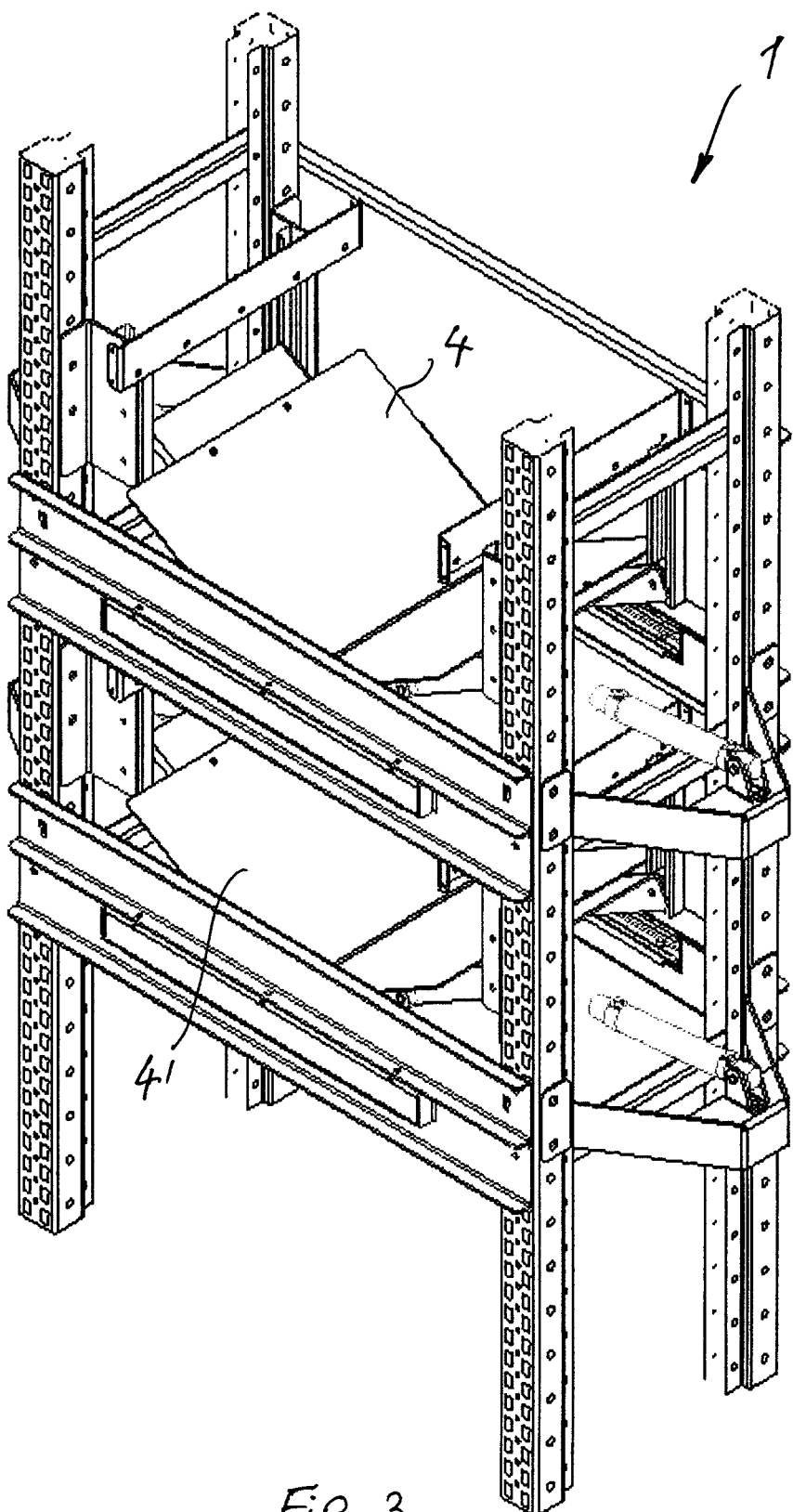
FIG. 3 is a view similar to that in FIG. 2 showing the vertical conveyor with the shells closed.
Figure 4:
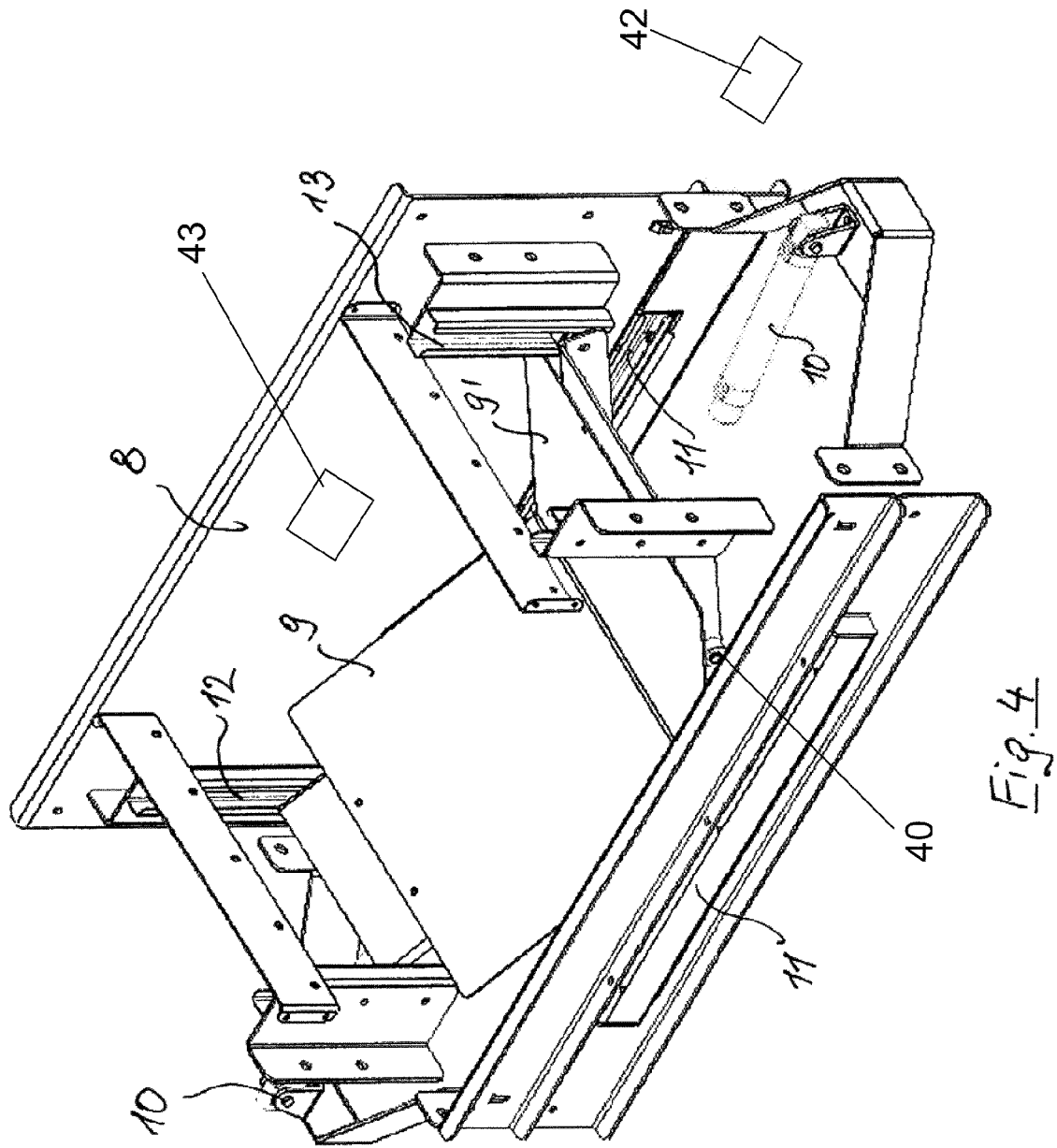
FIG. 4 is a cut-away perspective view of a single shell of the vertical conveyor according to FIGS. 2 and 3 in the closed state.
Figure 5:
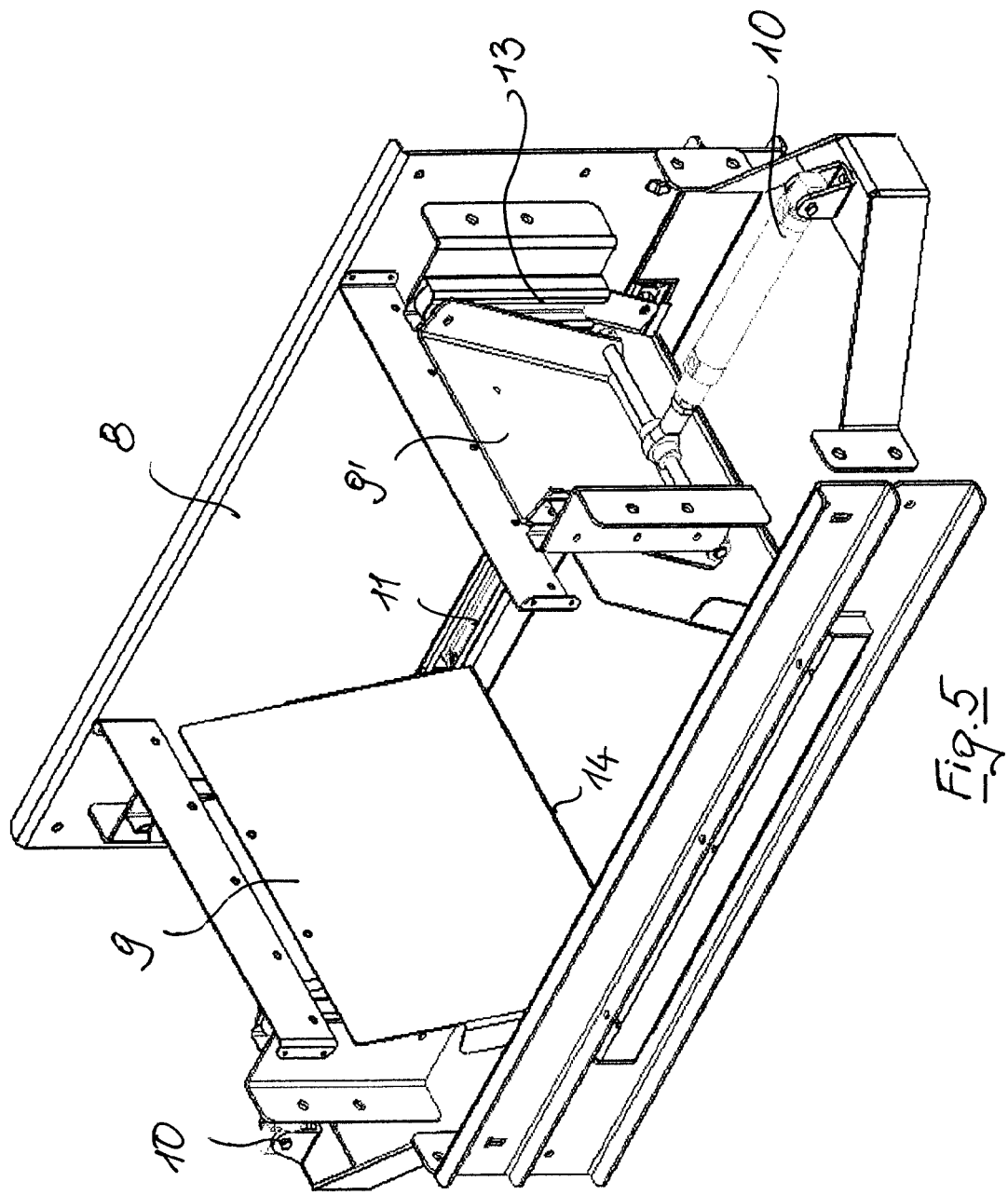
FIG. 5 is a cut-away perspective view of a single shell of the vertical conveyor according to FIGS. 2 and 3 in the opened state.
Figure 6:
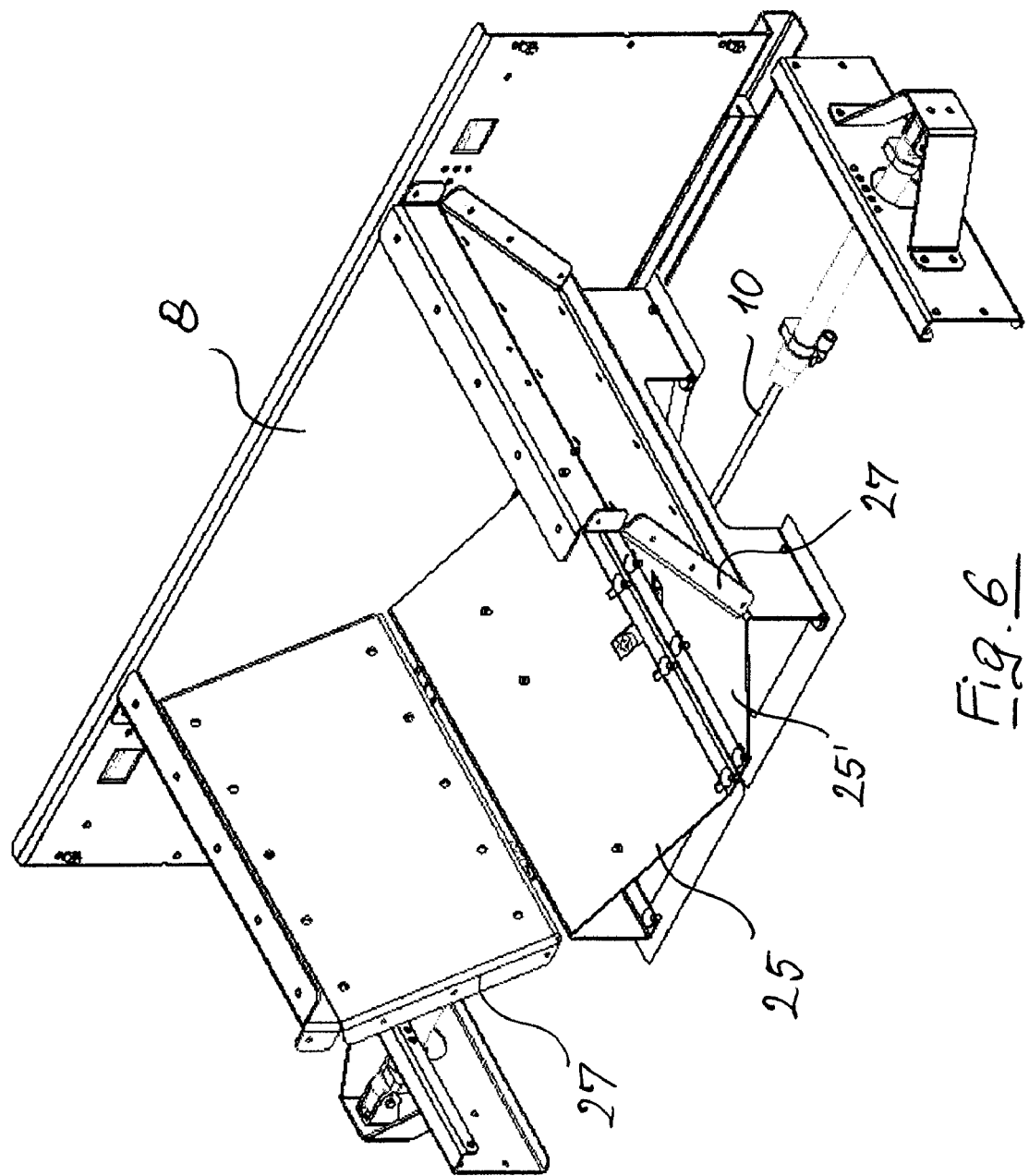
FIG. 6 is a cut-away perspective view similar to FIGS. 4 and 5 of a shell of another shape with two bottom-side slides in the closed state.
Figure 7:
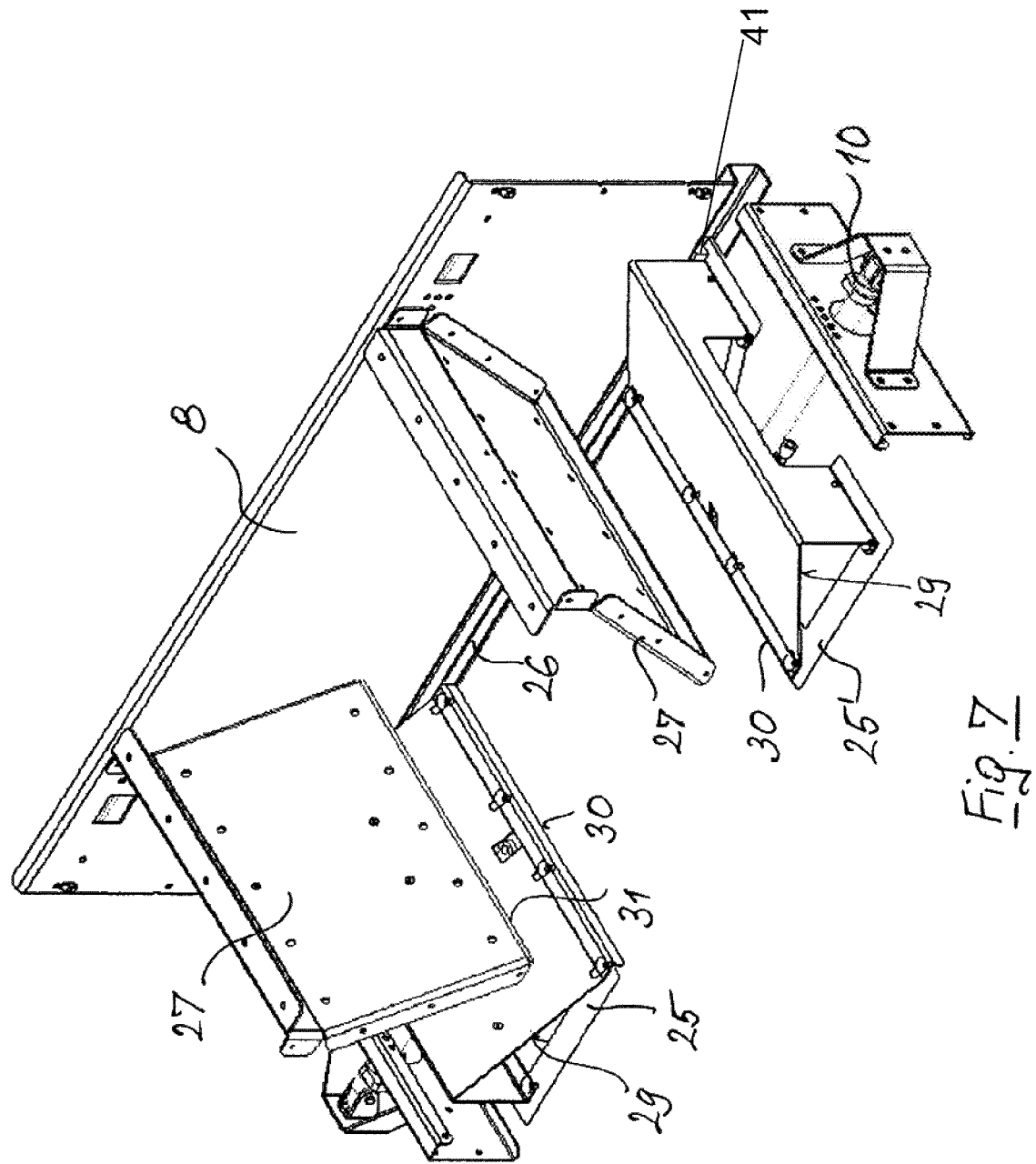
FIG. 7 is a cut-away perspective view similar to FIGS. 4 and 5 of a shell of another shape with two bottom-side slides in the opened state.
Figure 8:
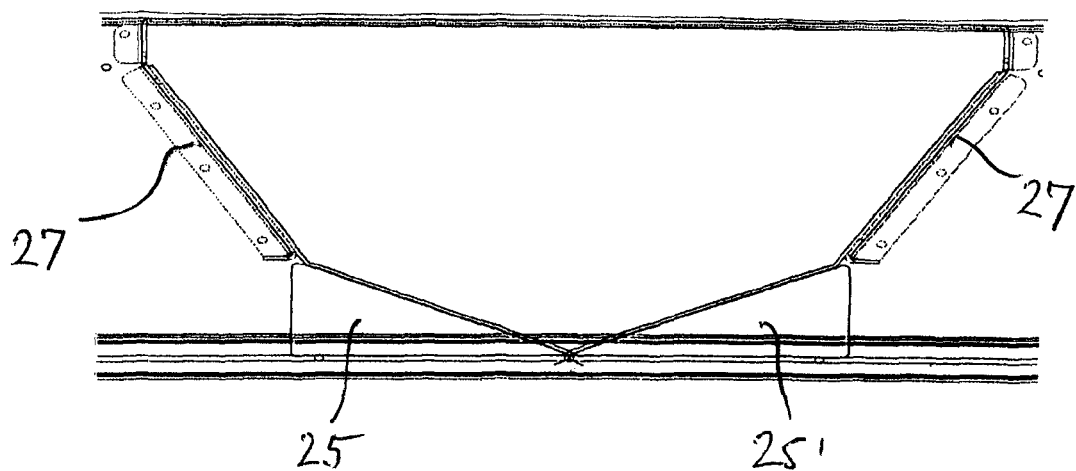
FIG. 8 is a schematic side view of the shell according to FIG. 6.
Figure 9:
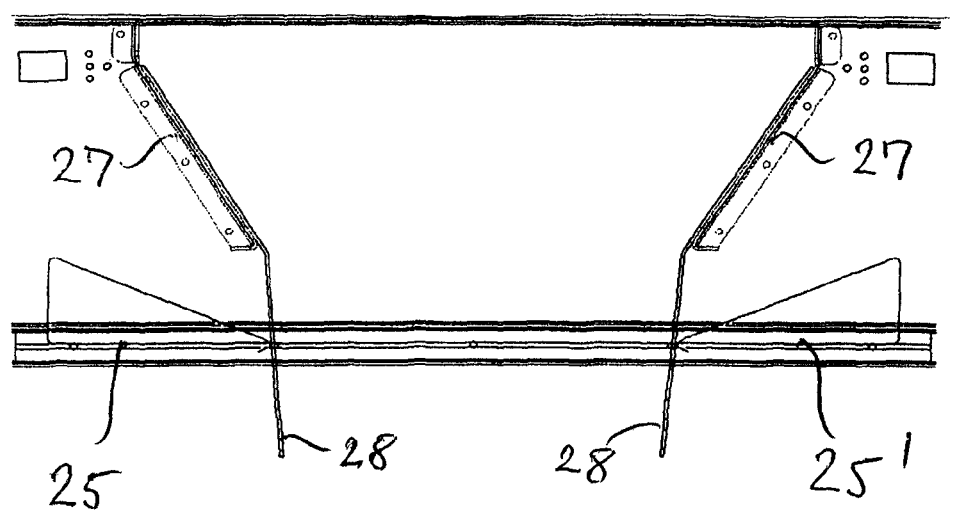
FIG. 9 is a schematic side view of the shell according to FIG. 7.
Figure 10:
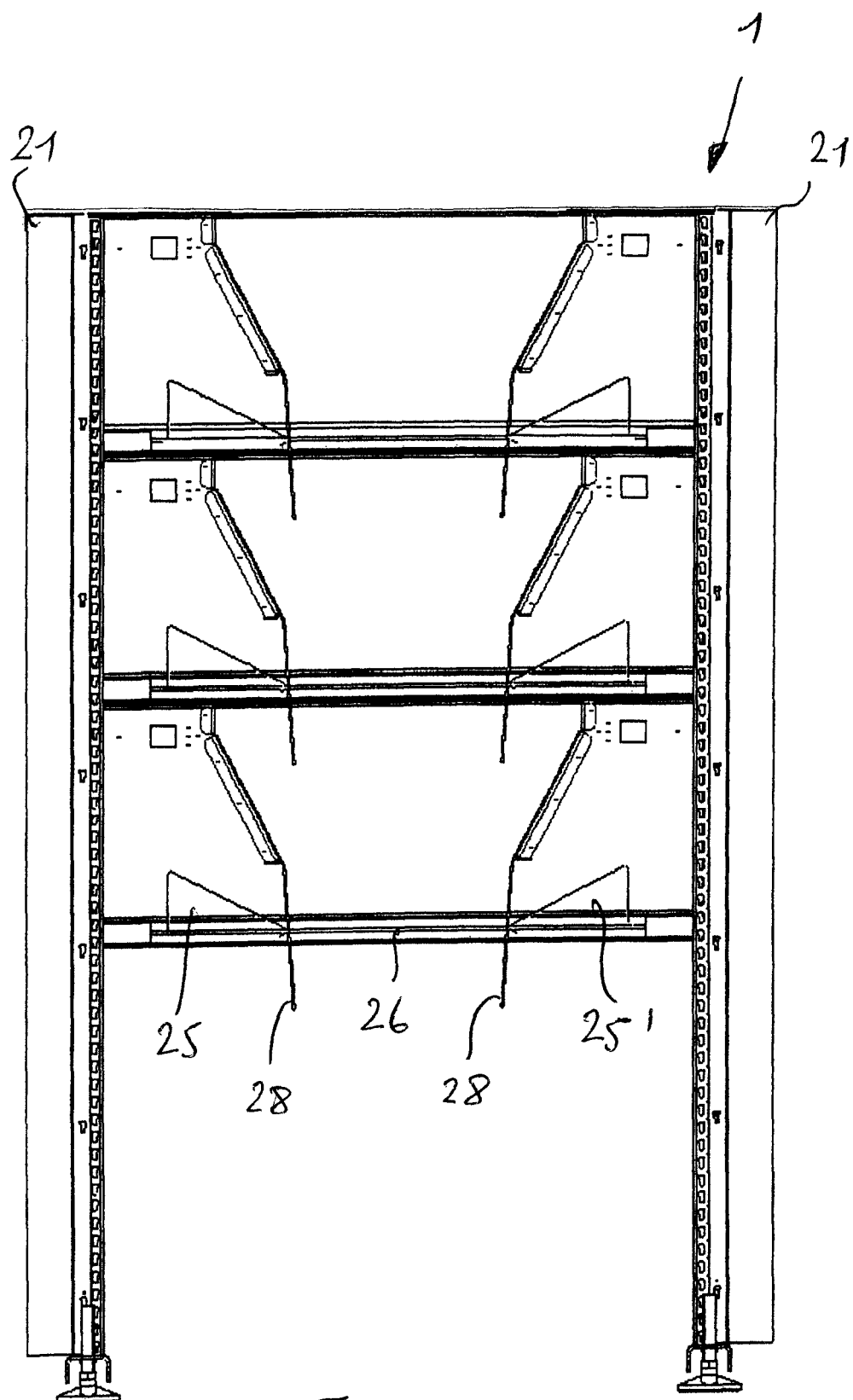
FIG. 10 is a schematic side view similar to that in FIG. 1 showing the vertical conveyor with shells according to FIGS. 6 through 9.

Referring to the drawings in particular, a vertical conveyor 1 in a commissioning system for vertically conveying materials being conveyed of the type of individually packaged products of a commissioned order M, M' comprises an upper transfer point 2 and a lower transfer point 3.

The upper transfer point 2 of the commissioning system is defined by the longitudinal end of a horizontal central belt 5 of an automatic commissioning unit, which is arranged upstream and is not shown specifically, the horizontal central belt 5 being driven in the direction of arrow 20.

The upper transfer point 2 may also be the lateral end area of the central belt 5, in which case the transfer of the materials being conveyed is performed by means of cross slides.

The lower transfer point 3 is the inlet area of a horizontal discharge conveyor 6, which is located in a lower position and on which a container containing the ordered goods 7 is arranged. The container containing the ordered goods 7 is located at a vertically spaced location of about 1 m from the central belt 5.

A buffer hopper may also be provided instead of the container containing the ordered goods 7 and/or the discharge belt.

The vertical conveyor 1 has a plurality of (two in the exemplary embodiment according to the drawings) identical shells 4, 4' located at equally spaced locations in a vertical array as a vertical tower, which bridge over the height difference between the upper and lower transfer points 2, 3.

A plurality of vertical towers may be provided in a parallel array.

The shells 4, 4' may be self-contained components or structural modules, the number of structural modules being determined by the conveying height or the height difference to be bridged over between the upper and lower transfer points 2, 3. In one embodiment variant, the structural modules may be plugged vertically into one another.

In the embodiment variant shown in FIGS. 1 through 5, the shells 4, 4' are connected to four vertical perforated corner ledges 21, which have additional cross struts 22. The length of the corner ledges 21, which have an angular cross section, is determined by the height of the vertical towers. Many prefabricated perforation sites 23 of the profiled corner ledges make it possible to select different distances between the shells (the distance between which is equal) with a simple mounting effort. If the shells 4, 4' are mounted with, especially screwed to, the corner ledges 21, a stable vertical tower is obtained.

Each stationary shell 4, 4' of the vertical tower can be opened to release picked-up materials being conveyed. The shell has bottom/side flaps that can be opened, namely, two tilting walls 9, 9' or slides 25, 25' of identical design, which can be opened downwardly, through which material being conveyed, which is picked up in the shell 4, falls downwardly in the opened state into the next lower shell 4' and/or onto the lower transfer point 3 according to the two exemplary embodiments shown in the drawings.

Each shell 4, 4' has two opposite stationary side walls 8, which are located at spaced locations from one another, and the above-mentioned two tilting walls 9, 9' between them, which face each other, and which can be adjusted by a horizontal, oblique or vertical adjusting drive 10 from a closed V position into a nearly vertical parallel position, which is open on the bottom side, by a control means (not shown). The control means is part of the central control unit of the automatic commissioning unit.

The adjusting drive 10 has a pneumatic component and has a 5/3-way valve with two solenoid valves per level or shell, two magnetic switches (Reed contacts) per pneumatic cylinder being provided for the "open" and "closed" positions. The central control unit assumes the control of the logical sequence in conjunction with an intelligent bus node.

A plurality of shells 4, 4' or a plurality of levels may optionally be actuated by a common adjusting drive.

The two stationary side walls 8 have, on the inside of the shell, guide rails 11, 12, 13, in which the tilting walls 9, 9' are guided as slides. Two separate slides are guided, on the one hand, vertically and, on the other hand, horizontally. The pneumatic cylinder per slide brings about a motion of a shell along two axes (cf. product shell "closed" and "open" according to FIGS. 4 and 5).

In particular, each side wall 8 has a lower horizontal guide rail 11 in the bottom area of the shell and a vertical guide rail 12, 13 in the lateral area, in which said rails the tilting walls are guided at the lower ends and at the laterally upper ends via rollers 40 or sliding blocks 41.

The two tilting walls 9, 9' and/or the two side walls 8 may have a shock-absorbing, wear-resistant inner lining for the soft transfer of the material being conveyed.

The tilting walls 9, 9' are sloped by about 30° to 45° to the horizontal in the closed V position and abut against each other with their lower horizontal edges 14 or the inner lining thereof.

Both opposite side walls 8 (only one side wall is shown in the exemplary embodiment shown in the drawings) extend vertically, but they may also extend downwardly in a conically tapered form.

Each shell may have at least one checking means for the material being conveyed for recognizing the material being conveyed in the shell and/or for controlling the material being conveyed or the order by the shell, especially a photoelectric cell 43, which is connected to the control means 42 and the adjusting drive 10.

During the operation of the vertical conveyor 1, the material being conveyed arrives from the topmost shell at the lowermost shell and from there to the lower transfer point 3 by cycling opened and/or closed shells 4, 4'.

In particular, at least a portion m of an order M of material being conveyed can be automatically entered according to FIG. 1 into the topmost, closed shell 4 at the upper transfer point 2. The topmost shell 4 is then opened by the adjusting drive 10 while a shell 4' located under it is closed and the shell 4' located under it is filled as a result, and the shell 4' conveys the material being conveyed into the next lower, closed shell in the manner of the topmost shell 4 after filling and opening, and so on, until the lowermost opened shell transfers the material being conveyed to the lower transfer point 3.

The closed topmost shell 4 may be optionally filled with material being conveyed m of the commissioned order M or of a new commissioned order M' still before the material being conveyed is transferred at the lower transfer point 3. Depending on the particular case, the overall conveying height, the distance between the shells and/or the consistency of the material being conveyed, the material being conveyed may also pass through one or more adjacent shell(s) 4, 4', which are opened simultaneously, and optionally also through all opened shells simultaneously.

In case of corresponding opening of individual tilting walls 9, 9', the material being conveyed may also pass through all shells 4, 4' that are half opened simultaneously in a cascading manner in a zigzag pattern.

As an alternative, closed shells 4, 4' may be used as intermediate storage units in case of corresponding actuation of the tilting walls 9, 9'.

While shells 4, 4' with two tilting walls 9, 9', which are adjustable as a whole, are shown in the exemplary embodiment according to FIGS. 1 through 5, stationary transverse walls 27 are provided in the upper area instead of the mobile tilting walls and special slides 25, 25', which assume the same function as the tilting walls, are provided in the lower area in the exemplary embodiment according to FIGS. 6 through 10.

In particular, two opposite, adjustable bottom-side slides 25, 25' of a wedge shape with a horizontal underside and an oblique top side or an upper oblique surface 29 are provided. The slides 25, 25' are guided in horizontal guide rails 26 on the insides of the side wall 8 and have a shock-absorbing means each in the form of a flexible belt or tab 28, which also ensures shock absorption at the transverse walls 27, covers same and is attached in a suspended manner to the transverse walls 27 and extends beyond the lower horizontal edge 31 of the transverse walls 27. In the area of a slide, the belt or tab lies loosely on the oblique surface 29 of the slide 25, 25' at least when the slide is closed. The two wedge-shaped slides 25, 25' directed towards one another have horizontal edges 30, which are directed towards each other at the tip of the wedge, abut against each other when the slides are closed and thus ensure a closed shell 4, 4'. The transverse walls 27 are arranged obliquely and extend with their lower horizontal edge 31 up to the bottom-side slides 25, 25'. The slope of the oblique surface 29 of the slides 25, 25' is about 30° relative to the horizontal.

While specific embodiments of the invention have been shown and described in detail to illustrate the application of the principles of the invention, it will be understood that the invention may be embodied otherwise without departing from such principles.

The invention claimed is:

1. A device for vertically conveying material conveyed in a multi-shell vertical conveyor, the device comprising:

a vertically oriented support arrangement supporting conveyed material, said support arrangement comprising a plurality of shells, each shell comprising a first vertical guide rail, a second vertical guide rail, a first displaceable adjustable tilting wall, a second displaceable adjustable tilting wall, a first stationary side wall and a second stationary side wall, said first stationary side wall being located opposite said second stationary side wall, said first stationary side wall being located at a spaced location from said second stationary side wall, said first stationary side wall having a first lower horizontal guide rail, said second stationary side wall having a second lower horizontal guide rail, said first displaceable adjustable tilting wall and said second displaceable adjustable tilting wall being located between said first stationary side wall and said second stationary side wall, said first vertical guide rail being arranged adjacent to a lateral area of said first displaceable adjustable tilting wall, said second vertical guide rail being arranged adjacent to a lateral area of said second displaceable adjustable tilting wall, said first displaceable adjustable tilting wall being located opposite said second displaceable adjustable tilting wall, said first displaceable adjustable tilting wall being movable along said first lower horizontal guide rail, said second lower horizontal guide rail and said first vertical guide rail such that said first displaceable adjustable tilting wall moves from a closed position to an open position, said second displaceable adjustable tilting wall being movable along said first lower horizontal guide, said second lower horizontal guide rail and said second vertical guide rail from said closed position to said open position, wherein said first displaceable adjustable tilting wall and said second adjustable tilting wall are adjustable in height, said first displaceable adjustable tilting wall engaging said second displaceable adjustable tilting wall in said closed position, said conveyed material being transferred in a downward direction in said open position via one or more of said shells such that said conveyed material is arranged into one of a next lower shell and a lower transfer point.

2. A device in accordance with claim 1, wherein said first displaceable adjustable tilting wall and said second adjustable tilting wall have a first height in said closed position, said first displaceable adjustable tilting wall and said second adjustable tilting wall having a second height in said open position, said first height being less than said second height.

* * * * *